May 4, 1943. N. W. BERNARD 2,318,453
SPRING MOTOR
Filed Dec. 23, 1941 2 Sheets-Sheet 1
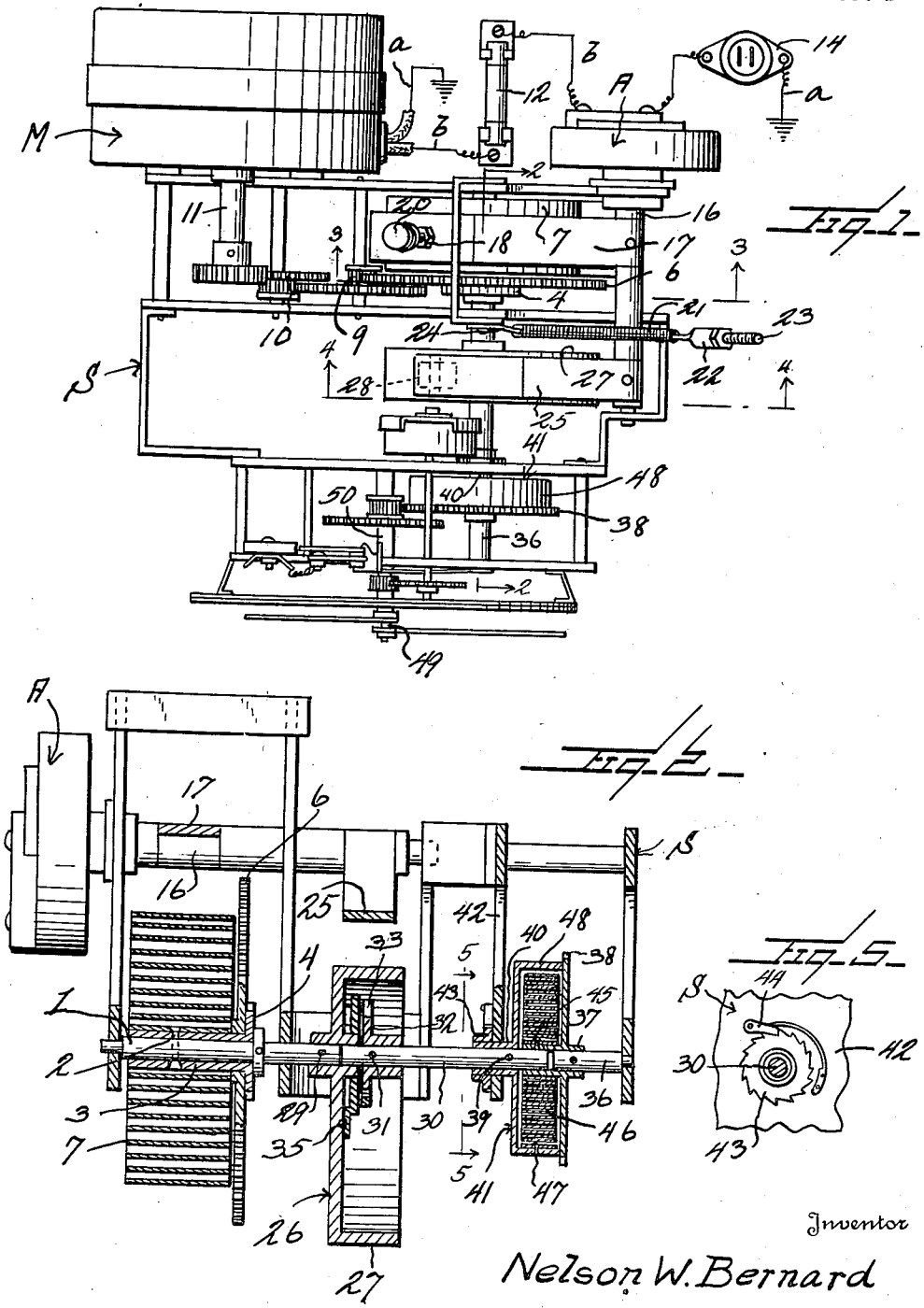
Inventor
Nelson W. Bernard
By Watson E. Coleman
Attorney May 4, 1943.  N. W. BERNARD  2,318,453
SPRING MOTOR
Filed Dec. 23, 1941   2 Sheets-Sheet 2
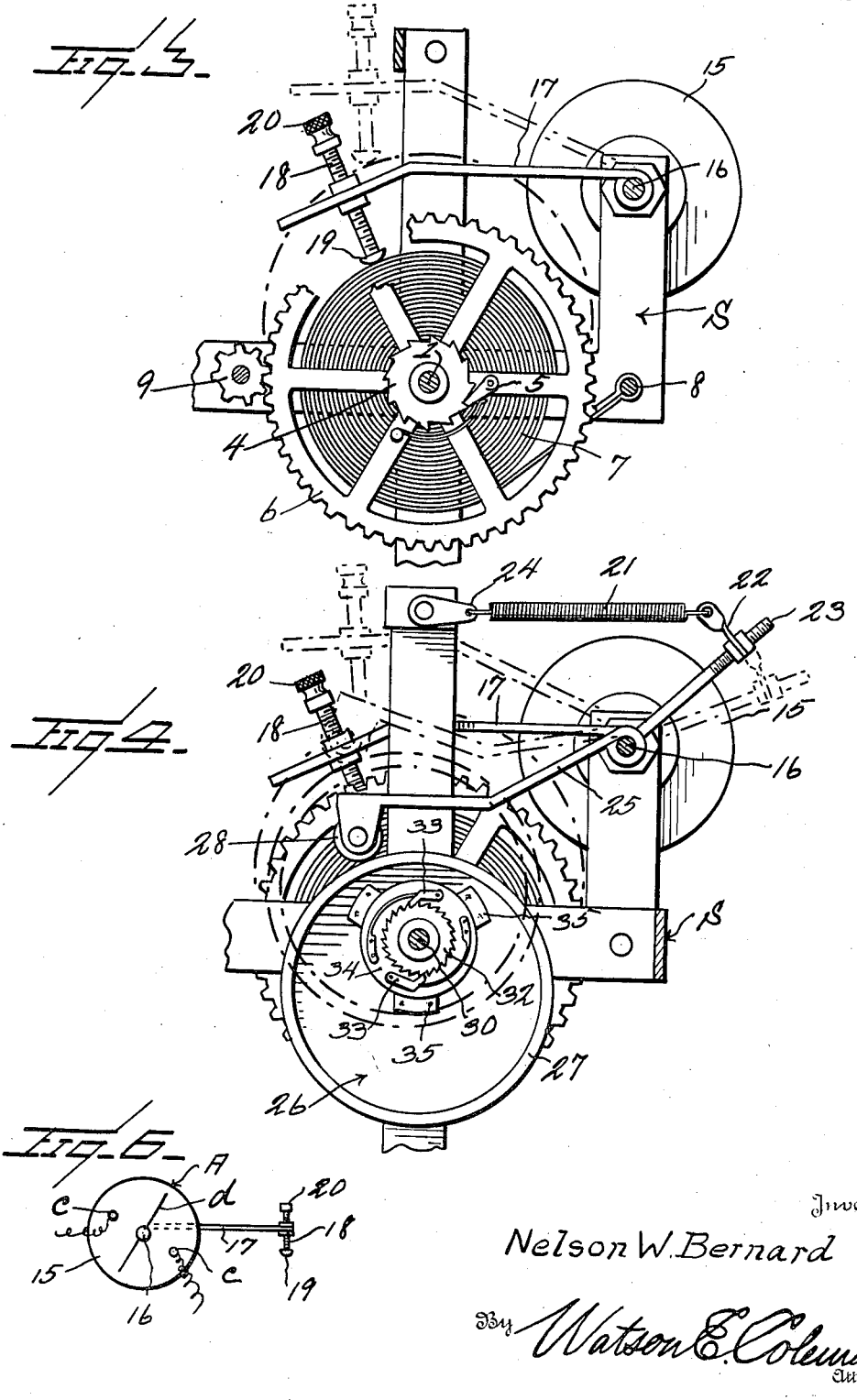
Inventor
Nelson W. Bernard
By Watson E. Coleman
Attorney Patented May 4, 1943

2,318,453

UNITED STATES PATENT OFFICE 2,318,453

SPRING MOTOR

Nelson W. Bernard, Danville, Va., assignor of one-fourth to Clarence J. Gilbert and one-fourth to Beverly J. Gilbert, both of Danville, Va.

Application December 23, 1941, Serial No. 424,179

6 Claims. (Cl. 185—39)

This invention relates to a spring motor, and it is primarily an object of the invention to provide means whereby an electric motor is intermittently operated to keep wound the main spring for the motor.

It is also an object of the invention to provide an apparatus of this kind comprising a spring driven power shaft having associated therewith means under electrical control for intermittent operation to maintain the operating spring for the shaft substantially fully wound during the period the circuit for the electrical means is effective, so that in the event such circuit should become ineffective the driving spring for the shaft may operate for a considerable period of time in order to give full opportunity for the ineffective circuit to be restored, whereupon said main or driving spring will be again substantially entirely wound, and thereby reducing to a minimum the chances of the apparatus coming to a dead stop.

Another object of the invention is to provide an apparatus of this kind comprising a drive shaft and a driven shaft, the driven shaft being operatively connected with the drive shaft through the medium of a winding spring, said spring when fully wound connecting the driven shaft and drive shaft for unitary rotation, said spring providing supplemental means for rotating the driven shaft during such periods when the drive shaft is not rotating.

The invention also has for an object to provide an apparatus of this kind comprising a spring driven shaft together with electrically operated means for winding the spring for the shaft, said electrically operated means including a circuit having a make and break switch interposed therein, together with means driven from the shaft for intermittently moving the switch into closed position to normally maintain the spring substantially wound, and wherein further means are provided for adjusting the switch into closed position under the action of the spring in the event said spring should substantially fully unwind, and which unwinding will occur upon shutting off of the electrical energy other than by the switch.

The invention consists in the details of construction and in the combination and arrangement of the several parts of my improved spring motor whereby certain important advantages are attained, as will be hereinafter more fully set forth.

In order that my invention may be the better understood, I will now proceed to describe the same with reference to the accompanying drawings, wherein—

Figure 1 is a view in top plan, of a somewhat diagrammatic character, illustrating a motor constructed in accordance with an embodiment of my invention;

Figure 2 is an enlarged fragmentary sectional view taken substantially on the line 2—2 of Figure 1, looking in the direction of the arrows;

Figure 3 is an enlarged detailed sectional view taken substantially on the line 3—3 of Figure 1, looking in the direction of the arrows;

Figure 4 is an enlarged detailed sectional view taken substantially on the line 4—4 of Figure 1, looking in the direction of the arrows;

Figure 5 is a detailed sectional view taken substantially on the line 5—5 of Figure 2, looking in the direction of the arrows; and Figure 6 is a fragmentary view, of a diagrammatic character, of the snap make and break switch as herein embodied.

As illustrated in the accompanying drawings, the motor is of a type particularly intended for use in connection with a clock mechanism, although I wish to state that I do not desire to be understood as limiting myself to a motor for this exact purpose, as the invention as herein comprised can be employed in connection with spring motors of general utility.

As disclosed in the accompanying drawings, S denotes a supporting structure designed and arranged as the requirements of practice may necessitate. Rotatably supported by the structure S is a drive shaft 1 on which is fixed, as at 2, a spindle 3. One end portion of this spindle 3 carries a ratchet wheel 4 with which coacts, in a conventional manner, a spring pressed pawl 5 carried by the gear wheel 6 fixed to the spindle 3 immediately adjacent to the ratchet wheel 4. The means 2 for holding the spindle 3 to the shaft 1 also anchors to the spindle the inner end portion of a main helical spring 7. The outer end portion of this spring 7, as particularly illustrated in Figure 3 of the drawings, is suitably anchored, as at 8, to the supporting structure S. This spring 7 is of such size to provide means whereby the shaft 1 may be rotated thereby for a considerable period of time. While I do not wish to limit myself to any particular time, yet in practice I find it best that this spring 7 be capable of rotating the shaft 1 for a period of approximately forty hours. The gear wheel 6 constitutes a winding gear for the spring 7 and meshing with this gear wheel 6 is a pinion 9 in driven connection through a gear train 10 with the power shaft 11 of a suitable electric motor M. In the present embodiment of my invention this motor M is carried by the structure S and the circuit for the motor includes a conductor a grounded through the structure S and a conductor b. The conductor b has interposed therein a conventional safety fuse 12, and said conductors a and b are operatively connected with a conventional fixture 14 adapted to be coupled to a suitable source of electrical energy.

Also interposed in the conductor b is a circuit maker and breaker A of a conventional snap switch type, as is diagrammatically illustrated in Figure 6 of the drawings. This switch A includes the usual radially aligned stationary contacts c with which coact the rotating contact arms d. These contacts c and d are within a suitable casing 15 fixedly mounted in desired position upon the structure S. The snap contact arms d are carried by an operating shaft 16, and which shaft extends across and is also supported by the structure S. The shaft 16, as herein disclosed, is above and in relatively close proximity to the shaft 1 hereinbefore referred to.

Fixed to the shaft 16 is an elongated rock arm 17 of a length to extend over the spring 7 hereinbefore referred to. The outer or free end portion of this arm 17 has threaded therethrough an elongated member 18. The inner end portion of this member 18 is provided with a rounded head 19 with which the spring 7 directly contacts as the spring unwinds so that upon unwinding of the spring 7 the arm 17 will be swung upwardly and when said spring 7 is substantially unwound the shaft 16 will have been rotated sufficiently to bring the arms d of the switch A into engagement with the contacts c, thus assuring closing through said switch A of the circuit for the motor M. The outer end portion of this member 18 carries an operating head 20 whereby said member 18 may be adjusted endwise through the arm 17 as the requirements of practice may prefer.

The contact arms d of the switch A are, during the normal operation of the apparatus, maintained in open position for breaking the operating circuit for the motor M under the action of the retractile spring 21, one end portion of which being suitably anchored to a fixture 22 adjustably mounted upon the free end portion of an upwardly disposed rock arm 23 rigid with the shaft 16. The opposite end portion of the spring 21 is suitably anchored, as at 24, to a desired part of the structure S. By proper adjustment of the fixture 22 along the rock arm 23 the tension of the spring 21 may be regulated.

The shaft 16 also has rigid therewith a second rock arm 25. This rock arm 25 is downwardly disposed with respect to the shaft 16 and overlies a circular cam member 26. This member 26 is of dished formation and includes a peripheral flange 27 with which directly contacts from above a roller 28 carried by the outer or free end portion of the rock arm 25.

This cam member 26 is eccentrically mounted upon an end portion of the shaft 1 and fixed, as at 29, to said shaft 1 for rotation therewith. The flange 27 of the cam member 26 is disposed in a direction away from the adjacent end of the flange 1. The throw or high point of the cam member 26 is such that upon each revolution of the shaft 1 the rock arm 25 will be swung a distance sufficient to close the switch A to cause the motor M to reversely rotate the shaft 1 to rewind the spring 7. The speed of rotation of the shaft 1 may be as desired, but preferably once in about every one hour and fifteen minutes.

Aligned with the shaft 1 and rotatably supported by the structure S is an intermediate shaft 30 which closely approaches the shaft 1. Fixed, as at 31, to this shaft 30, and within the cam member 26, is a ratchet wheel 32 with which coact the spring pressed pawls 33. These pawls 33, as herein disclosed, are carried by a plate 34 fixedly secured, as at 35, as by welding, to the adjacent portion of the cam member 26. In the present embodiment of the invention I provide two pawls 33 and it is to be noted that the pawls 33 have their free or working ends so arranged as to be relatively spaced apart about one-half the width of a tooth of the ratchet 32 so that substantially at all times there will be an effective or clutching engagement of one of the pawls 33 with the ratchet 32.

Through the medium of the ratchet 32 and the pawls 33 in the normal rotation of the shaft 1 under the action of the spring 7, the shaft 30 will be correspondingly rotated, but upon reverse rotation of the shaft 1 for winding the spring 7 the shaft 1 will be declutched from the shaft 30.

It is important to provide for the continued forward rotation of the shaft 30 during the retrograde rotation of the shaft 1 so that there will be continuous forward rotation of the driven shaft 36. This shaft 36, in the present embodiment of my invention, is rotatably supported by the structure S and through the medium of the hub 37 of a gear wheel 38 the shaft 36 is further supported by the adjacent end portion of the shaft 30 with which the shaft 36 is aligned. The hub 37 of the gear 38 freely receives the adjacent end portion of the shaft 30 and keyed, as at 39, to said end portion of the shaft 30 is an outstanding hub 40 carried by the central portion of a spring housing 41. This hub 40, as herein disclosed, is disposed through an adjacent member 42 of the structure S and adjacent to said member 42 the hub 40 carries a ratchet wheel 43 with which coacts a spring pressed pawl 44 mounted on said member 42 of the structure S. This ratchet 43 and pawl 44 allow the shaft 30 to readily have forward turning movement but hold said shaft 30 against retrograde rotation.

Fixed, as at 45, to the hub 37 of the gear 38 is the inner end portion of a supplemental helical spring 46, the outer end portion of which being anchored, as at 47, to the peripheral flange 48 of the housing 41. Upon initial unitary forward rotation of the shafts 1 and 30, the spring 46 will be wound and after such spring 46 has been fully or tightly wound the shaft 36 will have forward rotation in unison with the shaft 30. However, during the period the shaft 1 is in retrograde rotation the spring 46 will operate to assure continued forward rotation of the driven shaft 36 so that throughout the continued operation of the motor the shaft 36 will have uninterrupted rotation, as such rotation will not be effected during the periods the shaft 1 is in retrograde rotation for winding the spring 7.

In the present embodiment of my invention, the motor or apparatus is particularly shown adapted for use in connection with a clock, and the minute shaft 49 and the hour shaft 50 are in operative connection with the gear 38 in a conventional manner, and as this forms no particular part of the present invention a detailed description and illustration is believed to be unnecessary.

Under normal conditions, the cam member 26 operates through the medium of the associated arm 25 to intermittently wind the spring 7, but in the event there should be abnormal interruption to the current for operating the motor M and the spring 7 should continue to unwind beyond the periods determined by the cam member 26, and before the spring 7 is completely unwound, said spring will contact the member 18 and swing the arm 17 sufficiently to close the circuit maker and breaker A, so that when the current is restored, the motor M will operate to rewind the spring 7.

From the foregoing description it is thought to be obvious that a spring motor constructed in accordance with my invention is particularly well adapted for use by reason of the convenience and facility with which it may be assembled and operated.

I claim:

1. A motor comprising, in combination, a shaft, a helical spring operatively engaged therewith to rotate the shaft in one direction, an electric motor for rotating the shaft in a retrograde direction to wind the spring, an operating circuit for the motor, a normally open switch interposed in said circuit, means rotating with the shaft and coacting with the switch for intermittently closing the circuit, and additional means operated by the helical spring when substantially unwound and operating independently of the last-named means for closing the circuit.

2. A motor comprising, in combination, a shaft, a helical spring operatively engaged therewith to rotate the shaft in one direction, an electric motor for rotating the shaft in a retrograde direction to wind the spring, an operating circuit for the motor, a normally open switch interposed in said circuit, means rotating with the shaft and coacting with the switch for intermittently closing the circuit, a second shaft, a member rotating with the first shaft and coacting with the switch for intermittently closing the switch, and a clutching means coacting with the member and the second shaft for causing the second shaft to rotate with the first shaft when said first shaft is rotating under the action of the spring, said clutching means being declutched when the first shaft is in retrograde rotation.

3. A motor comprising, in combination, a shaft, a helical spring operatively engaged therewith to rotate the shaft in one direction, an electric motor for rotating the shaft in a retrograde direction to wind the spring, an operating circuit for the motor, a normally open switch interposed in said circuit, means rotating with the shaft and coacting with the switch for intermittently closing the circuit, and a second means operated by contact with the spring when substantially unwound for closing the switch, said second means operating independently of the first means.

4. A motor comprising, in combination, a shaft, a helical spring operatively engaged therewith to rotate the shaft in one direction, an electric motor for rotating the shaft in a retrograde direction to wind the spring, an operating circuit for the motor, a normally open switch interposed in said circuit, means rotating with the shaft and coacting with the switch for intermittently closing the circuit, a second shaft for rotation with the first shaft when said first shaft is in rotation under the action of the spring, and means independent of the spring for continuing such rotation of the second shaft during the period the motor is turning the first shaft in retrograde direction, said last named means also constituting a clutching element for operatively connecting the two shafts.

5. A motor comprising, in combination, a shaft, a helical spring operatively engaged therewith to rotate the shaft in one direction, an electric motor for rotating the shaft in a retrograde direction to wind the spring, an operating circuit for the motor, a normally open switch interposed in said circuit and including an operating shaft, a rock arm carried by said second shaft, a cam element rotating with the first shaft, said rock arm being in operative engagement with the cam, and means coacting with the second shaft for normally holding the switch open, the cam rotating with the first shaft swinging the rock arm sufficiently to turn the second shaft to close the switch.

6. A motor comprising, in combination, a shaft, a helical spring operatively engaged therewith to rotate the shaft in one direction, an electric motor for rotating the shaft in a retrograde direction to wind the spring, an operating circuit for the motor, a normally open switch interposed in said circuit and including an operating shaft, a rock arm carried by said second shaft, a cam element rotating with the first shaft, said rock arm being in operative engagement with the cam, means coacting with the second shaft for normally holding the switch open, the cam rotating with the first shaft swinging the rock arm sufficiently to turn the second shaft to close the switch, and a second rock arm carried by the second shaft and terminating adjacent to the helical spring, said helical spring when substantially unwound moving the second rock arm a distance sufficient to turn the second shaft to close the switch.

NELSON W. BERNARD.